United States Patent [19]

Fulconis et al.

[11] 4,126,661
[45] Nov. 21, 1978

[54] PROCESS FOR PRODUCING PRODUCTS OF CROSS-LINKED THERMOPLASTIC MATERIAL

[75] Inventors: Thierry Fulconis, Nancy; Bernard Ginglinger, Pont-a-Mousson, both of France

[73] Assignee: Pont-a-Mousson S.A., Nancy, France

[21] Appl. No.: 779,879

[22] Filed: Mar. 21, 1977

[30] Foreign Application Priority Data

Jul. 19, 1976 [FR] France .............................. 76 21933

[51] Int. Cl.$^2$ ............................................. B28B 3/20
[52] U.S. Cl. .................................. 264/209; 264/236; 264/261; 264/308; 264/329
[58] Field of Search .............. 264/236, 329, 174, 308, 264/211, 209, 176 R, 261; 425/114, 378

[56] References Cited

U.S. PATENT DOCUMENTS

| 3,374,304 | 3/1968 | Ayres et al. ........................... 264/308 |
| 3,461,490 | 8/1969 | Cottingham ......................... 264/236 |
| 3,546,326 | 12/1970 | Seifert et al. ........................ 264/211 |
| 3,868,436 | 2/1975 | Ootsuji et al. ....................... 264/236 |
| 3,876,736 | 4/1975 | Takiura .............................. 264/40.7 |
| 3,928,525 | 12/1975 | Iuwa et al. .......................... 264/174 |
| 3,979,488 | 9/1976 | Greenhalgh et al. ................ 264/174 |
| 4,001,368 | 1/1977 | Michigoe et al. .................... 264/236 |
| 4,049,757 | 9/1977 | Kammel et al. ..................... 264/236 |

FOREIGN PATENT DOCUMENTS

1,538,988  9/1968  France .................................... 264/211

*Primary Examiner*—Jay H. Woo
*Attorney, Agent, or Firm*—Sughrue, Rothwell, Mion, Zinn and Macpeak

[57] ABSTRACT

The process is of the type comprising continuously shaping a mixture of thermoplastic material and cross-linking agent by pressure and then effecting the cross-linking by the cross-linking agent. The cross-linkable mixture is placed inside a sintering zone in which it is subjected to the action of pressure and a sintering temperature at the same time as it is put into shape. It is then conveyed without modification of shape by means of the same pressure to a zone where the cross-linking is effected by a rise in temperature. The device comprises in the following order, along a common axis, a device supplying the cross-linkable mixture, a sintering die and a cross-linking die. These dies define a continuous space in which the pressure is exerted and each comprise heating means.

8 Claims, 1 Drawing Figure

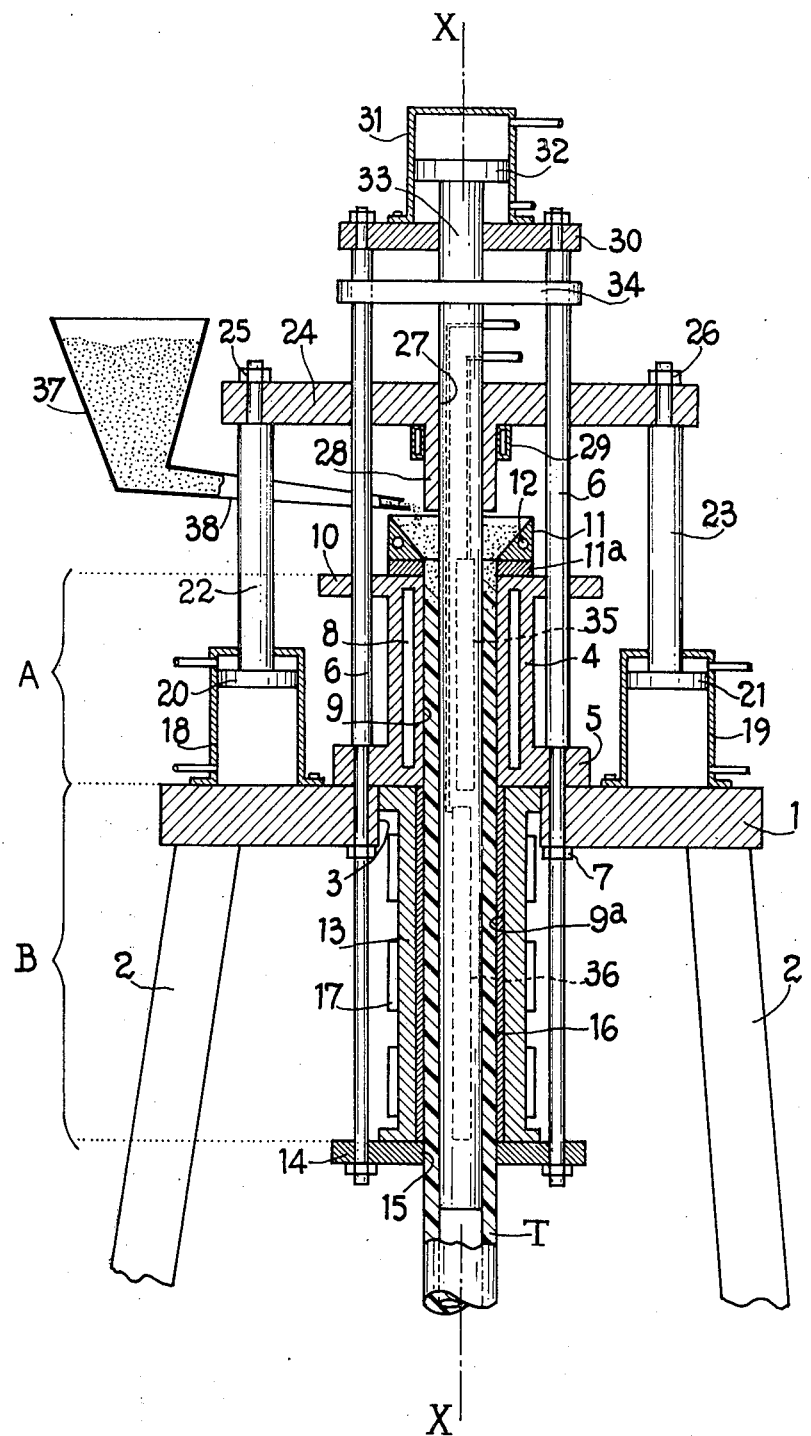

PROCESS FOR PRODUCING PRODUCTS OF CROSS-LINKED THERMOPLASTIC MATERIAL

The present invention relates to a process for producing products of cross-linked thermoplastic materials and to a device for carrying out the process. It more particularly concerns the continuous production of products of cross-linked high density polyethylene.

The cross-linking, by which two neighbouring polymer chains are directly interconnected by the intervention of a radiation or of an active carbon, is a known operation which may be applied to polyolefines, to vinyl polymers and to certain elastomers such as ethylene-propylene elastomers.

Its particular application to polyolefines such as low density polyethylene and to ethylene-propylene elastomers presents no major difficulty when the active carbon comes from an organic peroxide. Indeed, it is quite possible to differentiate the shaping phase or transformation phase from the cross-linking phase or vulcanization in respect of ethylene-propylene elastomers. In this case, the temperatures required for the transformation (extrusion, injection, forming) are lower than the temperature it is necessary to reach for producing the decomposition of the conventionally employed organic peroxides, as for example:

dicumyl peroxide;
ditertiobutyl peroxide;
2,5-dimethyl-2,5-di-(t-butyl)-hexane peroxide;
2,5-dimethyl-2,5-di-(t-butyl)-hexyne 3 peroxide.

Consequently there exists an interval of temperature which is sufficient to permit the transformation of the plastic material without resulting in the decomposition of the peroxide. In the forming phase the plastic material is said to be cross-linkable and has a viscosity permitting its transformation in accordance with conventional processes for acting on plastic materials.

The situation is different when it is necessary to cross-link high density polyethylene. In this case it is no longer possible to differenciate the forming or transformation phase according to conventional processes as for example extrusion or injection, from the cross-linking phase. The thermoplastic material only has a sufficiently low viscosity permitting its forming at temperatures of 170°–220° C. depending on the molecular weight of the high density polyethylene. Now, these temperatures are higher than the threshold of decomposition of peroxides (about 140° C. in respect of the least active peroxides). Consequently, it is impossible to produce objects of cross-linked high density polyethylene according to the processes for cross-linking low density polyethylene or for vulcanizing elastomers.

Consequently, an object of the present invention is to overcome these difficulties and provide a process for producing cross-linked products of plastics material from a mixture containing a cross-linking agent of the type in which the mixture of thermoplastics material and cross-linking agent is formed to shape in a continuous manner by pressure means and then the cross-linking is effected by means of said agent, wherein the cross-linkable mixture is placed inside a sintering zone in which it is subjected to the action of said pressure means and a sintering temperature at the same time as it is formed to shape and is conveyed without modification of shape by said pressure means to a zone where the cross-linking is effected by a rise in temperature.

This process is applicable in a particularly advantageous manner to the cross-linking of high density polyethylene in respect of which the temperature of fusion of the crystallites is higher than 130° C. The best results have been obtained with polyethylenes of a density higher than 0.950 and molecular weights of at least 200,000 which may be more than $10^6$. This process permits continuously producing section members, tubes, pipes in which the material is cross-linked in a homogeneous manner both within the mass and on the periphery thereof.

The interest of this process is that it permits distinctly differenciating the shaping phase from the cross-linking phase of the high density polyethylene, which is impossible with conventional processes, for mass producing section members or tubes, since the cross-linking occurs prematurely in the course of the forming to shape.

In this process the forming to shape is carried out directly on a mixture of powder of high density polyethylene and cross-linking agent, the product is sintered, then cross-linked with no risk of a heating due to the shearing which might produce a premature cross-linking of a part of the product resulting in heterogeneities in the extruded product, these heterogeneities having an adverse effect on the final characteristics of the product. As the cross-linking reaction is a chemical reaction the kinetics of which is a function of the temperature, it is important, in order to obtain a homogeneous product to have the same temperature rise per unit volume of material. This is achieved by the process according to the invention.

Another object of the present invention is to provide a device for carrying out the above-defined process which comprises, in the following order, along a common axis, a cross-linkable mixture supply means, a sintering die and a cross-linking die, said dies defining a continuous space in which pressure means exert their action and each comprising heating means.

The material is first formed to shape and then it progresses through the tool without modification of shape, the flux of material undergoing no division which s a source of heterogeneity. The flow is perfectly homogeneous and the material advances in the tool without possibility of creation of zones of stagnation which produce heterogeneities as concerns the cross-linking.

Further features and advantages of the invention will be apparent from the ensuing description with reference to the accompanyng drawing which is given solely by way of example to which the invention is not intended to be limited and in which the single FIGURE is a vertical sectional view of a device for extruding cross-linked products according to the invention.

As shown in this FIGURE, the extruding machine having a vertical axis X—X comprises a horizontal frame 1 which is made integral with a stand (not shown) by posts 2. The frame 1 has in the centre thereof a bore 3 and it acts as a support for a die 4 having an axis X—X and having a base 5 fixed to the frame 1 by rods 6 and bolts 7. The die 4 contains, parallel to its axis, an annular heating device 8 which encompasses the bore 9 of the die 4 which is coaxial with the bore 3 of the frame 1. The upper end of the die 4 has a flange 10 through which the rods 6 extend and its upper face supports a supply hopper 11 which is provided with an annular cooling device 12 for example employing a circulation of water. The hopper 11 has an opening in its base whose diameter corresponds to the diameter of the bore 9. The hopper 11 more precisely bears on the flange 10 through a metal ring 11a which is neither cooled nor heated and whose contacting surfaces are machined in such manner as to reduce the transmission of heat.

Disposed vertically against the base 5 of the die 4 and inside the frame 1 is a second die 13 which is coaxial with the die 4 and is maintained in position by a lower support plate 14 which is provided with an opening 15 corresponding to the bore of the die and is secured to the rods 6. The bore 9a of the die 13 is provided with an anti-adherence coating 16, for example of polytetrafluoroethylene, so as to diminish the friction of the material in the course of the cross-linking, the inside diameter of this coating being identical to the diameter of the bore 9 of the die 4. The assembly thus forms a rectilinear cylindrical passageway from the base of the supply hopper 11 to the opening 15 of the support plate 14. The die 13 is also provided with annular heating means, for examle constituted by outer electrical resistances 17.

The frame 1 acts as support outside the die 4 for two jack cylinders 18, 19 containing pistons 20, 21 which drive vertical rods 22, 23 on which a horizontal plate 24 is fixed by means of bolts 25, 26. The plate 24 is slidably mounted on the rods 6 and has in the centre thereof an opening 27 around which it is extended vertically by a sleeve 28 which acts as a piston and is in one piece with the plate 24 and extends toward the frame 1. The piston 28 carries, at the base thereof on the plate 24, cooling means 29 such as a circulation of water. The outside diameter of the piston 28 is so dimensioned that the latter cooperates externally with the wall of the bore 9 formed in the die 4.

The rods 6 support at their upper ends above the plate 24 a plate 30 on which bears a jack cylinder 31 containing a piston 32 integral with a vertical mandrel or plunger 33 extending at least to the base of the lower die 13, this plunger 33 being slidably mounted inside the piston 28 and having an anti-adherence coating in the zone thereof located within the die 13. The movement of the plunger 33 is guided by the plate 30 and by a horizontal plate 34 which is in one piece therewith and is slidable on the rods 6. The plunger 33 also has two heating elements 35, 36, for example employing a circulation of oil and extending, the first element 35, along the upper die 4 and, the second element 36, along the lower die 13.

The cross-linkable mixture intended to be fed to the device is constituted by a thermoplastic material in which there is distributed in an homogeneous manner a cross-linking agent prior to the feeding of the mixture to the device. The device is fed with the mixture by a metering tank 37 connected to the hopper 11 by a spout 33 which must ensure a homogeneous distribution of the powder in the gap between the plunger 33 and the dies 4 and 13. The hopper cooling device 12 ensures that the cross-linkable material, irrespective of the duration of its sejourn in the hopper, in no way reaches a temperature permitting the cross-linking to occur. The cooled zone of the material has an extent equal to once or twice the diameter of the plunger 33 so as to ensure a correct flow of the powder between the plunger 33 and the dies 4, 13.

The device just described operates in the following manner:

At the start of a cycle, the piston 28 is in the upper position and the plunger 33 is also in the upper position. Owing to the action of the pistons 20, 21 the piston 28 is made to descend and compresses the material placed in the hopper 11 where it is maintained at room temperature by the cooling device 12. As the piston 28 continues to descend, the material is crushed and then driven into the die 4 simultaneously with the plunger 33 which descends freely under the effect of the driving of the material owing to a reduction in the pressure acting on the piston 32. It is then subjected in the die 4 to a rise in temperature produced respectively by the heating elements 8 and 35 of the die 4 and plunger 33. When the piston 28 has reached the lower end of its travel, the pressure acting on the pistons 20, 21 is reduced and while the piston 28 is maintained in the lower position, the plunger 33 is raised by the piston 32. When this plunger has reached its upper position, the piston 28 in turn rises and a new cycle commences.

The die 4 therefore constitutes a sintering zone from which the material is urged, owing to the descending movement of the piston 28 along the plunger 33, into the zone of the die 13 where the temperature is higher so that the cross-linking of the mixture is produced. The rectilinear travel without modification in section eliminates any risk of a stagnation zone.

At the outlet of the die 13, the tube or T-section member is placed in a shape maintaining means where it is cooled.

By way of example, the extrusion of a tube having 1° an inside diameter of 16 mm and an outside diameter of 20 mm and a wall thickness of 2 mm, and 2° an inside diameter of 25 mm and an outside diameter of 32 mm and a wall thickness of 3.5 mm, was effected under the following conditions:

The thermoplastic material is a high density polyethylene having a molecular weight of 300 000 to 500 000, for example a PHILLIPS polyethylene, sold under the trademark "MANOLENE 56 020", having a density of 9.956 and a viscosity index equal to 2 under a pressure of 20 kg/sqcm. On the upstream side, a number of additives were mixed in a homogeneous manner with the polyethylene, for example by use of a rapid mixer having one or two vessels (hot vessel and cold vessel).

The additives comprise an organic peroxide, colouring agents, anti-oxidizing agents, anti-UV agents, lubricants, which are all known products employed in the plastics transforming industry. Depending on the catalysts and the temperatures of the various zones, it is possible to extrude a more or less cross-linked product by employing, for example, a 0.5% catalyzed formula of ditertiobutyl peroxide, sold under the trade name of "TRIGONOX B" and containing 0.4% of silicone oil as lubricant.

In this case, the process is carried out with 30 strokes of the piston per minute for a total piston travel of 40 mm, the extruded length is about 20 mm, the displacement of the plunger is 20–25 mm. The temperature of the material issuing from the sintering zone is of the order of 140° C. The temperature must indeed be higher than the temperature of fusion of the crystalline zones of the polyethylene, namely 135° C. On the other hand, it must be low enough to ensure that the cross-linking does not occur prematurely in the tool. This temperature of the material is obtained by heating the wall of the die to a temperature of 140°–200° C. and preferably between 160° and 180° C.

The regulation between 140 and 200° C. depends on the speed of passage through the tool and on the length of the sintering zone. In the present case, for example for a diameter of 20–25 mm, the sintering zone has a length of 390 mm for a linear flow of 20 to 50 meters per hour.

The heating temperature for the cross-linking die 13 is between 200 and 300° C. Indeed, it is necessary to arrange that the mass of polyethylene itself does not reach a temperature higher than 250° C. since degradation thereof would start and moreover the life of the PTFE coatings employed is inversely proportional to the temperature.

The pressure applied by the piston 28 is in any case lower than 1,800 bars. It is usually between 500 and 1,500 bars, since it depends on the temperature of the sintering zone as it is a function of the viscosity of the product. Generally, it is inversely proportional to the temperature in the sintering zone.

In the tube T, there is a maximum pressure at the border between the sintering and cross-linking zones in the region of the cross-linking die and more precisely its entrance. Furthermore, the duration of the sejourn is identical for the whole of the material, which is important for the cross-linking.

Portions of extruded tubes were subjected to tests concerning tensile strength, elongation, instantaneous bursting stress and measurements of the gelling extent, that is to say, the percentage of cross-linked material. The values obtained are grouped in the following table which shows the advantageous character of the process and device according to the invention.

TABLE

| Temperature | | | Characteristics Of The Extruded Product | | | |
| --- | --- | --- | --- | --- | --- | --- |
| Sintering | | | | | | |
| Zone A | Zone B | Pressure | | Tensile strength test | | Test under |
| (die 4 and plunger 33) | (die 13 and plunger 33) | of the piston | Gelling % | Stress kg/sqcm | Elongation | pressure at 100° C (stress: 40 bars) |
| 160° C | 200° C | 1200 bars | <20% | 250 | ≧500% | <50 hr. |
| 160° C | 220° C | 1000 bars | 60–70% | 230 | ≧300% | >5,000 hr. |
| 180° C | 220° C | 700 bars | 90–95% | 210 | ≧100% | >5,000 hr. |

According to a modification, the plunger 33 is fixed on its support 30. The device then operates in the following manner:

At the start of the cycle, the piston 28 is in the upper position. Owing to the action of the pistons 20, 21, the piston 28 is made to descend and this compresses the material placed in the hopper 11 where it is maintained at room temperature by the cooling device 12. As the piston 28 continues to descend the material is crushed and then driven into the die 4 without driving the plunger 33 which remains stationary. When the piston 28 reaches the lower end of its travel, it is raised to its initial position and a new cycle commences.

A formula of the same type as in the preceding example was extruded under these conditions. The temperatures remain identical and the pressures increase to 1,500–1,800 bars. The characteristics of the products obtained are identical to those given in the first example.

According to another modification of the device, no plate 24 and no pistons 20 and 21 are provided and the piston 28 is unitary with the plunger 33. The piston 28 is constituted in this case by a part in one piece with the upper zone of the plunger. Under the action of the piston 32, the plunger 33 is made to descend. The part of the plunger 33 performing the function of the piston 28 enters the die 4 and compresses the material placed in the hopper 11. The material is crushed and then driven into the die 4. When the piston-plunger 28-33 has reached the lower end of its travel, it is made to rise to its initial position by the piston 32. A formula was extruded with this device, the formula being of the same type as in the first example. In respect of pressures between 500 and 1,000 bars, the temperature of the sintering zone is between 140 and 160° C. and the temperature of the cross-linking zone between 200 and 250° C. The gelling extents vary from 20 to 95%, the tensile strength to rupture from 250 to 200 kg/sq.cm, the elongation from more than about 500 to about 100%, and the tests under stress from 10 to more than 5,000 hours.

Having now described our invention what we claim as new and desire to secure by Letters Patent is:

1. A process for producing a hollow tubular product of cross-linked high-density polyethylene from an essentially powdered cross-linkable mixture comprising said high-density polyethylene and a cross-linking agent, comprising forcing said mixture into and through an elongate passageway which extends longitudinally along an axis and has an annular cross-sectional shape, by exerting a pressure on said mixture in a direction parallel to said axis while maintaining the cross-sectional shape and size of the whole of said mixture in said passageway constant and while maintaining an upstream part of said passageway relative to the direction of travel of said mixture at a first temperature sufficient to sinter said mixture but insufficient to cross-link said high-density polyethylene and maintaining a downstream part of said passageway adjacent to said upstream part relative to the travel of said mixture at a second temperature distinctly higher than said first temperature and sufficient to cross-link said high-density polyethylene.

2. A process as claimed in claim 1, wherein said cross-sectional size and shape are maintained constant by making said passageway cylindrical throughout the length thereof.

3. A process as claimed in claim 1, wherein said pressure is exerted by a piston coaxial with said passageway.

4. A process as claimed in claim 1, wherein, in the case of a polyethylene having a high density exceeding 0.95 and a molecular weight equal to at least 200,000, the temperature of the sintering zone of said passageway is between 140° and 200° C.

5. A process as claimed in claim 4, wherein the temperature of the sintering zone of said passageway is between 160° and 180° C.

6. A process as claimed in claim 1, wherein, in the case of a polyethylene having a high density higher than 0.950 and a molecular weight equal to at least 200,000, the temperature of the cross-linking zone of said passageway is between 200° and 300° C.

7. A process as claimed in claim 1, wherein, in the case of a polyethylene having a high density higher than 0.950 and a molecular weight equal to at least 200,000, the pressure exerted on said mixture is between 500 and 1,800 kg/sq.cm.

8. A process for producing a hollow tubular product of cross-linked high-density polyethylene from an essentially powdered cross-linkable mixture comprising said high-density polyethylene and a cross-linking agent, comprising forcing said mixture into and through an elongate passageway which extends longitudinally along an axis and has an annular cross-sectional shape, by exerting a pressure on said mixture in a direction parallel to said axis while maintaining the cross-sectional shape and size of the whole of said mixture in said passageway constant and while maintaining an upstream part of said passageway relative to the direction of travel of said mixture at a temperature of 140°–200° C. and maintaining a downstream part of said passageway adjacent to said upstream part relative to the travel of said mixture at a temperature of 200°–300° C. to cross-link said high-density polyethylene.